(12) United States Patent
Takahashi

(10) Patent No.: US 7,573,591 B2
(45) Date of Patent: Aug. 11, 2009

(54) PRINTING APPARATUS WITH COMPONENT INFORMATION FAULT PROTECTION

(75) Inventor: Shigeyuki Takahashi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 903 days.

(21) Appl. No.: 10/981,732

(22) Filed: Nov. 4, 2004

(65) Prior Publication Data
US 2005/0134895 A1 Jun. 23, 2005

(30) Foreign Application Priority Data
Nov. 6, 2003 (JP) .............................. 2003-376775

(51) Int. Cl.
*G06K 15/00* (2006.01)
(52) U.S. Cl. .................................... 358/1.14; 358/1.16
(58) Field of Classification Search ................ 358/1.14, 358/1.16
See application file for complete search history.

(56) References Cited

U.S. PATENT DOCUMENTS

| | | | | |
|---|---|---|---|---|
| 4,961,088 A | * | 10/1990 | Gilliland et al. ............... | 399/25 |
| 5,283,613 A | * | 2/1994 | Midgley, Sr. .................... | 399/9 |
| 5,315,403 A | * | 5/1994 | Hirai et al. ................... | 358/404 |
| 5,950,038 A | | 9/1999 | Okui | |

FOREIGN PATENT DOCUMENTS

| | | |
|---|---|---|
| JP | 05-096818 | 4/1993 |
| JP | 10240091 A | 9/1998 |
| JP | 2001356670 A | 12/2001 |

OTHER PUBLICATIONS

Dictionary. The American Heritage® Dictionary of the English Language, Fourth Edition Copyright © 2007, 2000 by Houghton Mifflin Company. Updated in 2007. Published by Houghton Mifflin Company. Accessed from http://www.bartleby.com/61/49/I0144900.html on Dec. 11, 2008.*

* cited by examiner

*Primary Examiner*—Twyler L Haskins
*Assistant Examiner*—Fred Guillermety
(74) *Attorney, Agent, or Firm*—Hogan & Hartson LLP

(57) ABSTRACT

The present invention provides a printing apparatus that can be continuously used without imposing enormous cost and time on the user, even if a memory storing a information unique to a components is damaged, and a print control apparatus for controlling the printing apparatus. After the power of the printing apparatus is turned ON, it is judged first whether an upload is to be performed before initialization operation. This is judged by judging whether an engine board is one newly installed based on a value stored in a EEPROM at the engine side. Upload is performed if the engine board is one newly installed. If not, the engine information stored in the EEPROM at the engine side is backed up to the main side. Before performing the upload, it is judged whether the printing apparatus satisfies the uploadable conditions.

9 Claims, 3 Drawing Sheets

PRINTING APPARATUS WITH COMPONENT INFORMATION FAULT PROTECTION

BACKGROUND OF THE INVENTION

1. Field of the Invention

The present invention relates to a printing apparatus, including a printer and a copier, and a print control apparatus for controlling the printing apparatus, and more particularly to a printing apparatus and a print control apparatus to backup and upload engine information.

2. Description of the Related Art

In printing apparatus, including printers and copiers, information unique to the components to replace mechanical components and to manage the life of the entire device (hereafter engine information) is internally stored, allowing the user to know the appropriate time to replace components and when the life end cycle of parts ends, and making maintenance easier. Such engine information must maintain the stored content even if power is shut off, so normally a non-volatile memory, such as an EEPROM (Electrically Erasable and programmable Read Only Memory) is used (e.g. Japanese patent Application Laid-Open No. H5-96818).

SUMMARY OF THE INVENTION

However, if the non-volatile memory is damaged for any reason, the stored engine information is lost, and not only each component but all the mechanical components of the printing apparatus must be replaced. The user of the printing apparatus is forced to expend enormous repair cost and endure a repair time to replace the components.

With the foregoing in view, it is an object of the present invention to provide a printing apparatus and print control apparatus for controlling the printing apparatus that can continuously be used without imposing enormous cost and time on the user even if the memory storing engine information is damaged.

To achieve the above object, the present invention provides a printing apparatus for creating images on a printing medium based on printing data, comprising an engine control unit having a first memory for storing an information on a printing engine constituted by a plurality of component units, and a main control unit having a second memory for storing said information on said printing engine, for controlling said engine control unit, wherein said main control unit reads said information on said printing engine stored in said second memory and stores said read information in said first memory before initialization operation after power ON, according to a flag information stored in said first memory. Because of this, the engine information is backed up in the main control unit, so even if the first memory at the engine side is damaged thereafter, the printing apparatus can be continuously used without imposing cost and time on the user by uploading the engine information to a newly installed memory.

The above mentioned printing apparatus of the present invention is characterized in that said main control unit reads said information on said printing engine stored in said first memory and stores said read information in said second memory before the initialization operation after power ON according to said flag information. Because of this, even if the memory storing the engine information is damaged, the printing apparatus can be continuously used without imposing cost and time on the user.

The above printing apparatus of the present invention is characterized in that said flag information indicates whether said engine control unit is one newly installed in said printing apparatus, and said main control unit stores said information on said printing engine stored in said second memory before the initialization operation after power ON in said first memory, if said flag information indicates that said engine control unit is one newly installed in said printing apparatus. Because of this, it can be easily judged whether the engine board is one newly installed by the flag information stored in the memory at the engine side, and if it is one newly installed, the engine information is uploaded, therefore the printing apparatus can be continuously used without imposing cost and time on the user even if the memory storing the engine information is damaged.

The above mentioned printing apparatus of the present invention is characterized in that said main control unit reads said information on said printing engine stored in said first memory and stores said read information in said second memory before the initialization operation after power ON, if said flag information indicates that said engine control unit is not one newly installed in said printing apparatus. Because of this, it can be easily judged whether the engine board is one newly installed by the flag information stored in the memory at the engine side, and if it is not one newly installed, the engine information is backed up, therefore the printing apparatus can be continuously used without imposing cost and time on the user even if the memory storing the engine information is damaged in the printing operation thereafter.

The above mentioned printing apparatus of the present invention is characterized in that said main control unit reads said information on said printing engine stored in said second memory and stores said read information in said first memory before the initialization operation after power ON, if an error does not occur in said printing apparatus, a developer housed in said printing apparatus is not in the process of replacement, and said printing apparatus is not in the process of warm up. Because of this, the engine information stored in the first memory becomes information reflecting the initialization operation thereafter, and accurate maintenance becomes possible.

The above mentioned printing apparatus of the present invention is characterized in that said main control unit rewrites said flag information stored in said first memory after storing said information on said printing engine read from said second memory in said first memory. Because of this, the initialization information and printing apparatus operation can be performed without uploading the engine information as if the engine board were one newly installed thereafter.

To achieve the above object, the present invention provides a printing apparatus for creating images on a printing medium based on printing data, comprising an engine control unit having a first memory for storing an information on a printing engine constituted by a plurality of component units, and a main control unit having a second memory for storing said information on said printing engine, for controlling said engine control unit, wherein said main control unit reads said information on said printing engine stored in said first memory and stores said read information in said second memory before initialization operation after power ON, according to a flag information stored in said first memory. Because of this, the engine information is backed up at the main side, so even if the memory at the engine side is damaged, the printing apparatus can be continuously used without imposing cost and time on the user.

To achieve the above object, the present invention provides a printing apparatus for creating images on a printing medium based on printing data, comprising an engine control unit having a first memory for storing an information on a printing engine constituted by a plurality of component units, and a main control unit having a second memory for storing said information on said printing engine, for controlling said engine control unit, wherein said control unit reads said information on said printing engine stored in said second memory and stores said read information in said first memory before initialization operation after power ON, or reads said information on said printing engine stored in said first memory and stores said read information in said second memory before initialization operation after power ON, according to a flag information stored in said first memory. Because of this, the engine information can be backed up and uploaded based on the information stored in the memory at the engine side, so even if the memory at the engine side is damaged, the printing apparatus can be continuously used without imposing cost and time on the user.

To achieve the above object, the present invention provides a print control apparatus for a printing apparatus for creating images on a printing medium based on printing data, wherein said printing apparatus comprises an engine control unit having a first memory for storing an information on a printing engine constituted by a plurality of component units, said print control apparatus comprises a main control unit having a second memory for storing said information on said printing engine, for controlling said engine control unit, and said main control unit reads said information on said printing engine stored in said second memory and stores said read information in said first memory before initialization operation after power ON, according to a flag information stored in said first memory. Because of this, the engine information is uploaded to the memory of the newly installed engine board, so the print control apparatus that can continuously use the printing apparatus without imposing enormous cost and time on the user can be provided.

To achieve the above object, the present invention provides a print control apparatus for a printing apparatus for creating images on a printing medium based on printing data, wherein said printing apparatus comprises an engine control unit having a first memory for storing an information on a printing engine constituted by a plurality of component units, said print control apparatus comprises a main control unit having a second memory for storing said information on said printing engine, for controlling said engine control unit, and said main control unit reads said information on said printing engine stored in said first memory and stores said read information in said second memory before initialization operation after power ON, according to a flag information stored in said first memory. Because of this, the engine information can be backed up in the memory of the main controller in advance, so the print control apparatus that can continuously use the printing apparatus without imposing enormous cost and time on the user, even if the engine board is newly replaced for use of the printing apparatus thereafter, can be provided.

The achieve the above object, the present invention provides a print control apparatus for a printing apparatus for creating images on a printing medium based on printing data, wherein said printing apparatus comprises an engine control unit having a first memory for storing an information on a printing engine constituted by a plurality of component units, said print control apparatus comprises a main control unit having a second memory for storing said information on said printing engine, for controlling said engine control unit, and said main control unit reads said information on said printing engine stored in said second memory and stores said read information in said first memory before initialization operation after power ON, or reads said information on said printing engine stored in said first memory and stores said read information in said second memory before initialization operation after power ON, according to a flag information stored in said first memory. Because of this, the print control apparatus that can continuously use the printing apparatus without imposing enormous cost and time on the user, even if the memory storing the engine information is damaged, can be provided.

DESCRIPTION OF THE PREFERRED EMBODIMENTS

Figure 1:
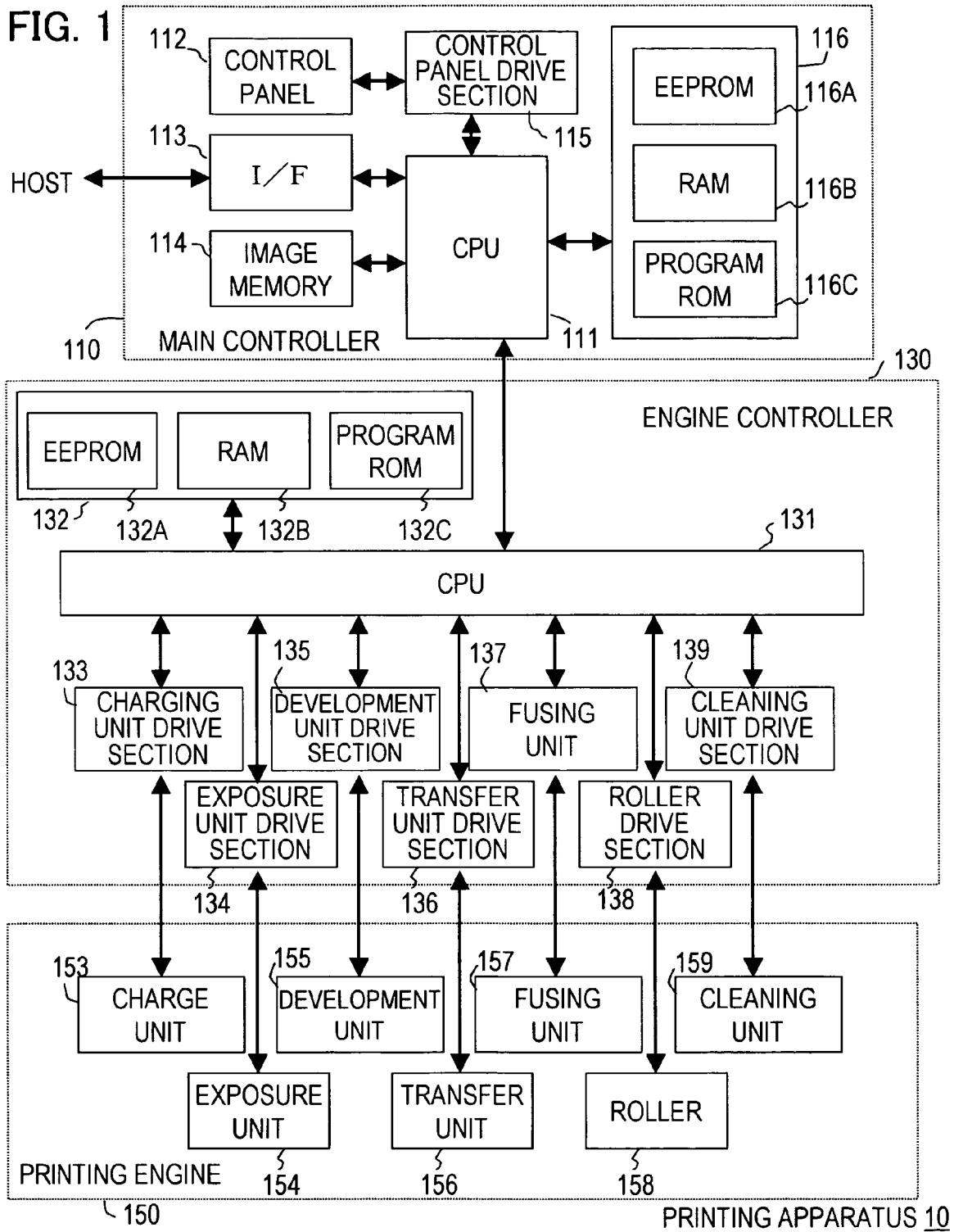
FIG. 1 is a diagram depicting the internal configuration of the printing apparatus 10.

Embodiments of the present invention will now be described with reference to the drawings. FIG. 1 is a diagram depicting general information of a printing apparatus 10 to which the present invention is applied. As FIG. 1 shows, the printing apparatus 10 is comprised of a main controller 110, engine controller 130 and printing engine 150.

The main controller 110 is connected to the host, and performs primarily image processing, such as color conversion and half tone processing, on the printing target data which is output primarily from the host. The engine controller 130 is connected with the main controller 110 and is also connected with the printing engine 150, and performs various controls for the printing engine 150. The printing engine 150 actually prints the printing data on the printing medium, such as printing paper and OHP slides.

The main controller 110 is comprised of a control panel 112, interface (I/F) 113, image memory 114, control panel drive section 115, memory unit 116 and CPU 111. The control panel 112 is connected with the control panel drive section 115, and can select the type of printing medium, size of the printing medium, number of pages, for example, via a liquid crystal display.

The I/F 113 is connected with the host and the CPU 111, so that the printing data and data, including various instructions (e.g. double sided printing or single sided printing, selection of ejection port) for printing data (hereafter printing job data) are input from the host, and are converted into data that can be processed onboard the printing apparatus 10. The image memory 114 is connected with the CPU 111 for storing the printing data which was input to the I/F 113 based on the control of the CPU 111.

The control panel drive section 115 is connected with the CPU 111 and with the control panel 112, for controlling the display format on the control panel 112. For example, when the CPU 111 reads the control program for displaying the data stored in the ROM 116c, and outputs a control signal to the control panel drive section 115, the control panel drive section 115 displays the display format for the user to make various selections on the control panel 112.

The memory unit 116 is comprised of a EEPROM 116a, RAM (Random Access Memory) 116b and program ROM (Read Only Memory) 116c. The EEPROM 116a is a non-volatile memory for storing an engine information unique to the engine, such as the consumable count data and main body life data, which is output from the engine controller 130 based on the control of the CPU 111, and also for storing a model information (e.g. model name, whether printing apparatus can print double sided or single sided only) of the printing apparatus 10. The consumable count data includes the amount of toner and ink which are set in the printing engine 150, and the amount of use of the photosensitive drum. This consumable count data is data on consumables, that is, components that the user can replace. The main body life data is, for example, data indicated by the rotation count of the roller transporting the printing medium. This main body life data is data on components that the user cannot replace, and this data allows the CPU 11 to know the life of the entire printing apparatus 10. The RAM 116b stores the execution result of various programs that are executed by the CPU 111. The RAM 116b plays a role of the working memory of the CPU 111. The program ROM 116c stores various programs that are executed by the CPU 111. According to the control of the CPU 111, a necessary program is read and various processings are executed.

The CPU 111 is connected with the I/F 113, image memory 114, control panel drive section 115 and memory unit 116, for controlling each unit, reading programs stored in the program ROM 116c and executing various processings. The CPU 111 operates as follows to execute image processing. The CPU 111 first stores the printing data included with the printing job data, which was input from the host via the I/F 113, in the image memory 114. And the CPU 111 reads the programs for the above image processing from the ROM 116c and executes such image processing as color conversion. The printing data after image processing is stored in the RAM 116b and is output to the engine controller 130 when necessary according to the control of the CPU 111. When the engine board, including the engine controller 130, is replaced, the CPU 111 outputs the engine information, including the consumable count data and the main body life data stored in the EEPROM 116a, to the CPU 131, and stores the engine information, which is output from the CPU 131, to the EEPROM 116a. Details will be described later.

The engine controller 130 is comprised of a memory unit 132, charging unit drive section 133, exposure unit drive section 134, development unit drive section 135, transfer unit drive section 136, fusing unit drive section 137, roller drive section 138 and cleaning unit drive section 139.

The memory unit 132 is comprised of a EEPROM 132a, which is a non-volatile memory, RAM 132b and program ROM 132c. The EEPROM 132a stores the engine information on the consumable count data on each engine unit and main body life data from each drive section 133-139 according to the control of the CPU 131. The RAM 132b plays a role of a working memory when the CPU 131 executes a program. The RAM 132b stores data after execution of a program by the CPU 131. The program ROM 132c stores programs which the CPU 131 processes, and various processings are executed by the CPU 131 reading these programs.

The charge unit 133 is connected to the CPU 131 and also to the charge unit 153 of the printing engine 150 for driving a charge unit 153 of the printing engine 150 based on the control data from the CPU 131. The drive section 133 receives an information on whether the charge unit 153 is installed or not, and so on, from the charge unit 153, and outputs it to the CPU 131.

The exposure unit drive section 134 is connected to the CPU 131 and also to the exposure unit 154 for driving a exposure unit 154, and irradiating a laser beam onto a photosensitive drum. The information on the printing data after image processing is input to the drive section 134 from the CPU 131, and the laser beam is irradiated based on this information.

The development unit drive section 135 is connected to the CPU 131 and also to the development unit 155 for driving a development unit 50 based on the control data from the CPU 131, attaching toner of each color to the latent image formed on the photosensitive drum, and performing development. Information on whether a container for containing toner of each color is installed or not, and so on, is input from the development unit 50 to the development unit drive section 135, and is output to the CPU 131.

The transfer unit drive section 136 is connected to the CPU 131 and also to a transfer unit 156 of the printing engine 150 for driving the transfer unit 156 based on the control data from the CPU 131, and transferring the toner image developed on the photosensitive drum to a printing medium via the intermediate transfer medium.

The fusing unit drive section 137 is connected to the CPU 131 and also to the fusing unit 157 of the printing engine 150 for driving the fusing unit 157 based on the control of the CPU 131, pressing the printing medium on which the toner image is transferred and fusing it to the printing medium. The cleaning unit drive section 139 is also connected to the CPU 131 and to a cleaning unit 159 for scraping off the toner image attached to the photosensitive drum by a blade in the unit 159 based on the control of the CPU 131.

The printing engine 150 is comprised of the charge unit 153, exposure unit 154, development unit 155, transfer unit 156, fusing unit 157, roller 158 and cleaning unit 159.

The charge unit 153 is for charging the photosensitive drum. The exposure unit 154 is comprised of a semiconductor laser and polygon mirror, and so on, and irradiates the laser beam on the photosensitive drum according to the printing data, and forms a latent image on the drum according to the printing data based on the control from the drive section 134. The development unit 155 is comprised of the container, where the toner of each color is contained, and the photosensitive drum, and so on, and moves the photosensitive drum to perform development by attaching toner in the container at the facing position according to the control data from the development unit drive section 136, and as a result the toner image is formed.

The transfer unit 156 is comprised of a primary transfer unit, intermediate transfer belt and secondary transfer unit. The photosensitive drum, on which the toner image is formed, is transferred to the intermediate transfer belt by the primary transfer unit, and the toner image is transferred from the intermediate transfer belt to the printing medium by the secondary transfer unit. The toner image is transferred to the intermediate transfer belt for each color contained in the container, and after all color images are transferred to the belt, the toner image is transferred to the printing medium.

The fusing unit 157 is comprised of a fusing roller pair, and so on, and fuses the toner image, which is transferred to the printing medium, by pressing the rollers to the printing medium based on the control of the fusing unit drive section 137. The roller drive section 138 is comprised of a paper feed roller, relay roller, paper eject roller and other rollers, for feeding the printing medium from a paper feed tray, by control of the roller drive section 138, and ejecting the printed medium to the eject port via the secondary transfer unit and fusing unit. The cleaning unit 159 is comprised of the blade and container, for scraping off the toner image attached on the photosensitive drum by a blade, and containing the toner in the container.

In the printing apparatus 10 configured in this way, the CPU 131 drives each unit 153-159 of the printing engine 150 by controlling each drive section 133-139, and by this driving, the information on the printing engine 150 constituting each unit 153-159 is input from each unit 153-159 to the CPU 131.

As described above, the information on the engine includes the consumable count data on the toner amount and the use amount of photosensitive material, and the main body life data, such as the rotation count of a roller. The information on the toner amount is the amount of toner in the container of each color in the development unit 155. For example, the current toner amount is counted by the sensor in the container, and is output to the CPU 131 via the development unit drive section 135. Or the number of pages of the printing medium that were fed may be counted by the sensor in the paper feed tray and is output to the CPU 131 so as to count the toner amount by the number of fed paper. Or the length of time when electricity was supplied to the container is counted by the drive section 135 and the CPU 131, and the toner amount is counted by this time. The use amount of photosensitive material is counted by the CPU 131 and drive section 135 by measuring the rotation count of the photosensitive drum, or the length of time when electricity was supplied to the photosensitive drum. This count information is stored in the EEPROM 132a based on the control by the CPU 131.

As the main body life data, data on the rotation count of the roller is also stored in the EEPROM 132a based on the control by the CPU 131. For this data, the length of time when electricity was supplied to each roller 158 or the rotation count counted by the sensor installed in each roller 158 is counted, and this information is input to the CPU 131 via the drive section 138, and is stored in the EEPROM 132a by the CPU 131.

For the engine information stored in the EEPROM 132a, control data is output from the CPU 111 of the main controller 110 to the CPU 131 so as to read the engine information stored in the EEPROM 132a if the power of the printing apparatus 10 is turned ON, and based on this control data, the CPU 131 reads the engine information stored in the EEPROM 132a, and outputs it to the CPU 111, and the CPU 111 stores this engine information in the EEPROM 116a. And each unit 153 is initialized at the main controller 110 side, and the above mentioned printing is performed based on the printing job data from the host.

By the main controller 110 reading the engine information if power is turned ON in this way, the printing apparatus transits smoothly to initialization and to the printing operation according to the updated engine information. For example, it is possible that each time the engine information stored in the EEPROM 132a of the engine controller 130 is updated, the engine information is stored in the EEPROM 116a of the main controller 110. However this makes it necessary to stop various processings, such as image processing and printing processing, that the CPU 111 and CPU 131 of the engine side and main side execute. This means that operation stops each time the engine information is updated when a large volume of data is printed, which makes printing time extremely long. For this reason, the engine information is copied from the EEPROM 132a at the engine side to the EEPROM 116a at the main side (hereafter called download) if power is turned ON.

If the EEPROM 132a of the engine controller 130 cannot be read for any reason, or when it is damaged, the engine information stored in the EEPROM 132a also cannot be read. In such a case, conventionally the engine information held thus far cannot be used due to convenience of maintenance issues, so all of the printing engines 150 must be replaced. Therefore in the present invention, if the engine board is newly installed in the printing apparatus 10 and power is turned ON, the engine information is stored in the newly installed EEPROM 132a via the CPU 111 and CPU 131, rather than in the EEPROM 116a of the main controller 110, which was the conventional way. Because of this, the previous engine information is held, so the printing apparatus 10 can be continuously used without imposing enormous cost and time on the user, without exchanging all the components constituting the engine 150. It is also possible to store the engine information in the newly installed EEPROM 132a after the engine board is replaced according to the instructions of the user using the control panel 112, but this forces the user to perform an operation, and a user inexperienced in this operation cannot store the engine information after the board is replaced, and the error display status continues, for example. For this reason, the engine information stored in the EEPROM 116a is automatically copied to the EEPROM 132a if power is turned ON (hereafter called upload), so that subsequent printing operations and an update of the engine information according to the operation can be executed without exchanging the mechanical components.

The information indicating whether the engine board is one newly installed in the printing apparatus 10 (or whether the EEPROM is one newly installed in the printing apparatus 10) is stored in the EEPROM 132a, and the CPU 111 can judge whether the engine board, including the engine controller 130, is one newly installed or is one that has been used since the previous power ON by the CPU 131, reading this information from the EEPROM 132a, and outputting this information to the CPU 111 if power is turned ON. For example, this information is stored in a predetermined address of the EEPROM 132a when the printing apparatus is shipped from the factory.

Figure 2:
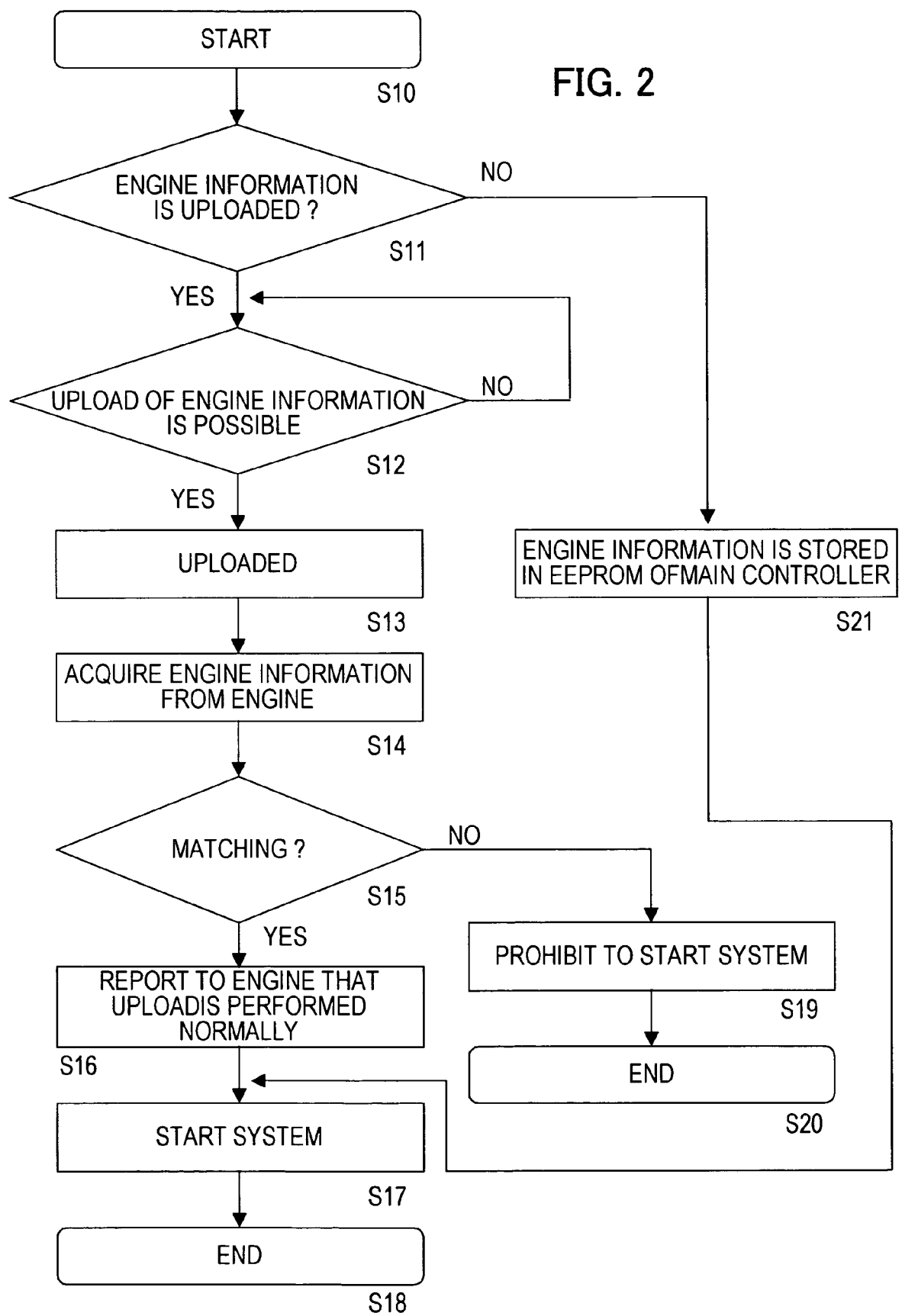
FIG. 2 is a flow chart depicting the upload and backup operations of engine information.

Specific details of this operation will now be described according to the flow charts in FIG. 2 and FIG. 3. FIG. 2 shows the general processing executed by the CPU 111 of the main controller 110 from power ON to system startup.

When power is turned ON by operating a predetermined button of the printing apparatus 10, the CPU 111 first reads the program for executing this processing, which is stored in the program ROM 116c, then processing starts (step S10). Then the CPU 111 judges whether the engine information is uploaded (step S11). This judgment is made based on the information stored in the EEPROM 132a indicating whether the engine board is one newly installed. In other words, as described above, the EEPROM 132a stores the information indicating whether the engine board is one newly installed, so by the CPU 111 outputting read instruction data for reading this information to the CPU 131, the CPU 131 reads this information from the EEPROM 132a, and outputs it to the CPU 111. If the information that was read is "0", this means that the engine board is one newly installed, and if "1", this means that the engine board is one that has been used continuously since the previous power ON, so the CPU 111 judges that upload is performed if "0", and that upload is not performed if "1", since the engine information has already been stored.

If upload is performed ("YES" in step S11), that is if the information that was read is "0" in the above example, the CPU 111 perform upload processing, and the CPU 111 first judges whether upload of the engine information is possible (step S12). For example, if the roller 158 of the engine 150 rotates after power ON, the engine status is different from the engine information stored in the EEPROM 116a at the main controller 110 side for this amount of rotation. This is because the amount of change caused by the rotation of the roller 158 is not incorporated into the engine information held by the main controller 110 side. Therefore upload must be performed in the status where the status before the printing operation is performed. Also an initialization operation may be performed before the printing operation depending on the type of the printing apparatus 10. For example, at the initialization operation, the container containing toner rotates to move to the home position after being installed in the printing apparatus. In this case, the toner amount changes depending on the rotation, so even if the engine information is uploaded during the initialization operation, the change amount of the toner cannot be incorporated into the engine information, which makes accurate maintenance difficult, such as the replacement time becomes incorrect and data cannot be printed. Therefore the uploadable status must be the status before the initialization operation, which is confirmed in this step.

Figure 3:
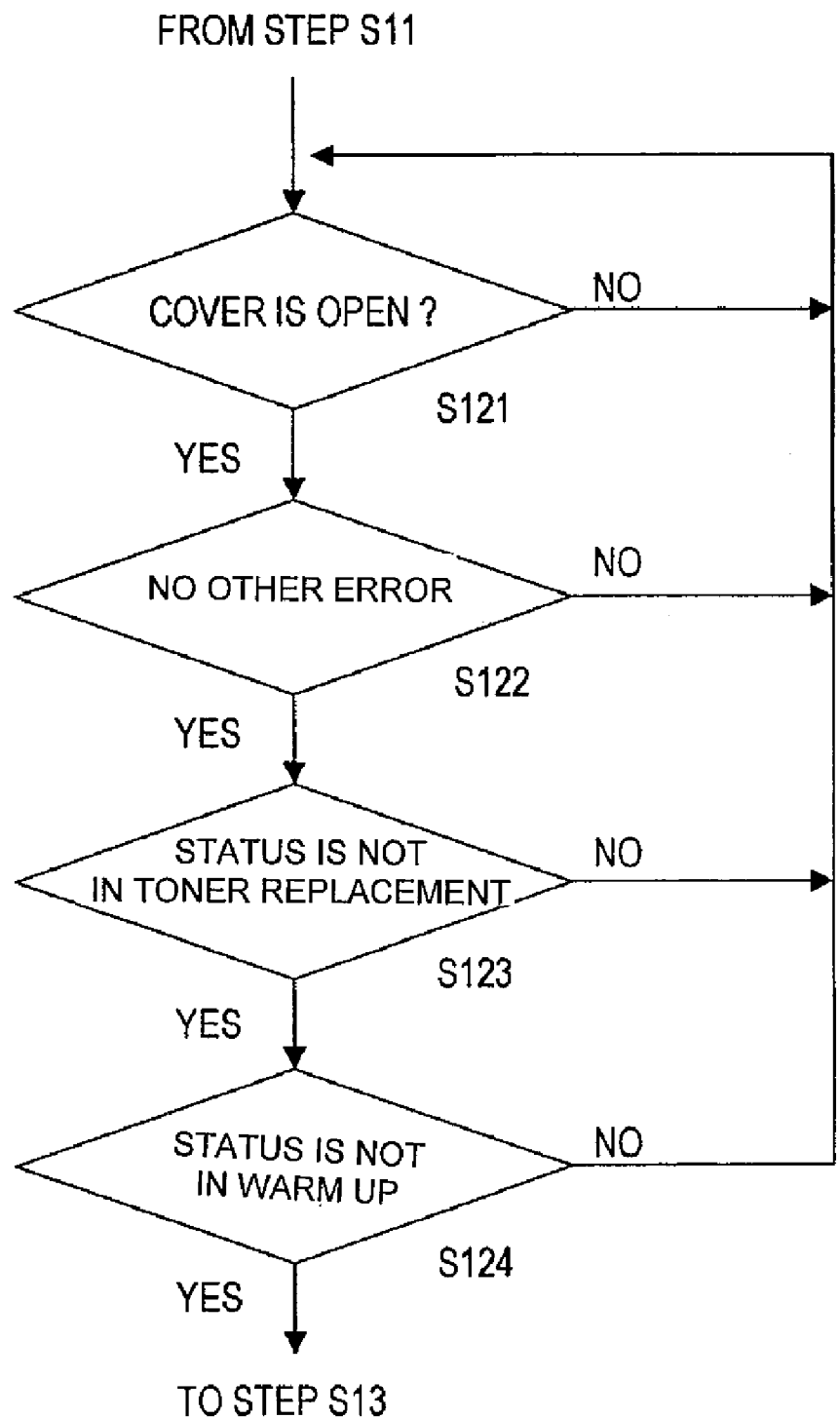
FIG. 3 is a flow chart depicting judging whether an upload is possible or not.

Specifically, the flow chart shown in FIG. 3 shows the details of step S12. In step S12, the CPU 111 first judges whether the cover is open (step S121). This is because if the cover of the printing apparatus 10 is closed, the printing apparatus 10 performs the operation for initialization, and the change by the initialization operation cannot be incorporated into the engine information stored in the EEPROM 116*a*. If the cover is closed ("NO" in step S121), the processing moves to step S121 again, and waits until the cover is opened.

If the cover is open ("YES" in step S121), the processing moves to step S122, and the CPU 111 judges whether other errors occurred. This is because an error occurs to the printing engine or to another area, and the CPU 111 and CPU 131 cannot read the engine information from the EEPROMs 116*a* and 132*a*. In this case as well, if an error occurred ("NO" in this step), the processing returns to step S121 again.

If there are no errors ("YES" in step S122), then the processing moves to step S123, and the CPU 111 judges whether the status is in the process of toner replacement. This is because if toner is replaced and a new container is installed in the printing apparatus 10, then the container moves from the installed position to the home position, as mentioned above, so the toner amount changes, and the information on this amount of change cannot be incorporated if the engine information is copied from the main controller 110 to the engine controller 130 by upload. If the status is in the process of toner replacement, ("NO" in step S123), the processing moves to step S121 again, and repeats the above mentioned processing.

If the status is not toner replacement ("YES" in step S123), the processing moves to step S124, and the CPU 111 judges whether the status is in the process of warm up. This is because the rollers of the printing apparatus 10 start rotation driving during warm up, so the engine information, particularly the main body life data, changes, and this amount of change is not incorporated into the engine information stored in the EEPROM 116*a*. If the status is in the process of warm up ("NO" in step S124), the processing moves to step S121 again, and repeats the above mentioned processing. If the status is not in the process of warm up ("YES" in step S124), the processing moves to step S13 in FIG. 2.

In this way, upload becomes possible only if all the uploadable conditions are cleared, that is, the cover is open, no errors have occurred, the status is not in the process of toner replacement and is not in the process of warm up. Following the processing according to the sequence in FIG. 3 is not always necessary, but is sufficient only if all of these conditions are satisfied. Therefore the step S124 in FIG. 3 may be first judged, then step S123, then step S122, and finally step S121. If even one condition is not cleared, upload is not actually performed until all the conditions are cleared.

Referring back to FIG. 2, if the uploadable conditions are cleared, the processing moves to step S13, and upload processing is performed. As mentioned above, the CPU 111 reads the engine information that is stored from the EEPROM 116*a* at the previous power ON, and outputs it to the CPU 131, and the CPU 131 stores this read engine information to the EEPROM 132*a*.

Then the CPU 111 acquires the engine information from the EEPROM 132*a* to confirm that the engine information uploaded to the EEPROM 132*a* is stored correctly (step S14). In other words, the CPU 111 outputs the control data for reading the engine information stored in the EEPROM 132*a* to the CPU 131. The CPU 131, which received this control data, reads the engine information stored in the EEPROM 132*a*, and outputs it to the CPU 111.

Then the CPU 111 judges whether the engine information read from the engine side and the engine information stored at the main side match (step S15). In other words, the CPU 111 judges whether the engine information read from the EEPROM 132*a* matches with the engine information read from the EEPROM 116*a*. If there is no match ("NO" in step S15), this means that upload was not performed correctly, and that initialization and the printing operation are not executed (step S19), and processing ends (step S20), since if initialization and the printing operation are executed in this status, then the engine information does not match between the main side and engine side, and that the time of exchanging components may be in error. In this case, the user turns the power ON again, and the above mentioned processing is repeated.

If "YES" in step S15, on the other hand, that is if the engine information matches between the main side and engine side, then the CPU 111 reports to the engine side that upload was performed normally (step S16). In other words, the CPU 111 outputs the control data to the CPU 131, so that the value to indicate that the engine board, including the engine controller 130, is not one newly installed ("1" in the above example) is stored in the EEPROM 132*a*. The CPU 131 rewrites the value stored in a predetermined address ("0" in the above example) of the EEPROM 132*a* based on this control data. By this, a normal upload end can be confirmed.

Then the CPU 111 starts up the system and executes the initialization operation, such as setting the rollers 158 to a predetermined rotation speed, controlling each unit of the main controller 110 so as to display a predetermined display format on the control panel 112, and controlling the engine controller 130. When the printing job data is input from the host side after this, the above mentioned printing operation is performed, and the series of processings ends (step S18).

If upload is not performed in step S11 ("NO"), the processing moves to step S21, and the CPU 111 reads the engine information from the EEPROM 132*a*, and stores it to the EEPROM 116*a* (backup). In this case, the information does not exist on a newly installed engine board, but exists on the engine board which has been used since the previous power ON, and is stored on the EEPROM 132*a* ("1" is stored in EEPROM 132*a* in the above example), so the engine information is backed up at the main side to make maintenance more convenient. And the processing moves to step S17 to execute the initialization operation, and the series of processings ends (step S18).

As described above, after power ON and before the initialization operation, it is first judged whether the engine board is one newly installed in the printing apparatus 10 based on the information stored in the EEPROM 132*a*, and if it is a newly installed one, the CPU 111 at the main side uploads the engine information from the EEPROM 116*a* to the EEPROM 132*a* at the engine side, and if not a newly installed one, the CPU 111 at the main side backs up the engine information from the EEPROM 132*a* at the engine side to the EEPROM 116*a* at the main side, so even if the memory storing the engine information is damaged, the printing apparatus can be continuously used without imposing enormous cost and time on the user.

In the description of the above example, the series of processings shown in FIG. 2 and FIG. 3 were assumed to be executed by the main controller 110 in the printing apparatus 10, but the exact same effect as the above example can be implemented when the host side executes the processings shown in FIG. 2 and FIG. 3. In this case, the above mentioned main controller 110 exists at the host side, and the host side executes processing, including image processing, and outputs the data after processing to the printing apparatus where the printing operation is executed. The host side functions as a print control apparatus for controlling the printing apparatus. This print control apparatus may be a personal computer, or a portable information terminal, such as a portable telephone and PDA (Personal Digital Assistant).

The EEPROMs 116a and 132a were described as the memories for storing the engine information, but any memory can be used if the content is stored even if power is turned OFF, such as a flash memory.

As the printing apparatus 10, the example of a laser printer was described in the above example, but the same effect can be implemented with an inkjet printer and bubble jet (registered trademark) printer. The example of a printer was described as the printing apparatus 10, but the same effect can be implemented for a copier and facsimile. And in the above example, the printing apparatus is described as a color printer, but a monochrome printer may be used.

What is claimed is:

1. A printing apparatus for creating images on a printing medium based on printing data, comprising:
    an engine control unit having a first memory for sequentially storing an information on a printing engine constituted by a plurality of component units when the printing engine performs printing after the initialization operation; and
    a main control unit having a second memory for storing said information on said printing engine, for controlling said engine control unit, wherein
    said main control unit reads said information on said printing engine stored in said second memory and stores said read information in said first memory before initialization operation after power ON when a flag information stored in said first memory is a first information, and reads information on said printing engine stored in said first memory and stores it in said second memory before the initialization operation after power ON when said flag information is a second information.

2. The printing apparatus according to claim 1, wherein said flag information is the first information when said engine control unit is one newly installed in said printing apparatus, and said flag information is the second information when said engine control unit is not one newly installed in said printing apparatus.

3. The printing apparatus according to claim 1, wherein said main control unit reads said information on said printing engine stored in said second memory and stores said read information in said first memory before the initialization operation after power ON, if an error does not occur in said printing apparatus, a developer housed in said printing apparatus is not in the process of replacement, and said printing apparatus is not in the process of warm up.

4. The printing apparatus according to claim 1, wherein said main control unit rewrites said flag information stored in said first memory after storing said information on said printing engine read from said second memory in said first memory.

5. A printing apparatus for creating images on a printing medium based on printing data, comprising:
    an engine control unit having a first memory for sequentially storing an information on a printing engine constituted by a plurality of component units when the printing engine performs printing after the initialization operation; and
    a main control unit having a second memory for storing said information on said printing engine, for controlling said engine control unit, wherein
    said main control unit reads said information on said printing engine stored in said first memory and stores said read information in said second memory before initialization operation after power ON, according to a flag information stored in said first memory.

6. A printing apparatus for creating images on a printing medium based on printing data, comprising:
    an engine control unit having a first memory for sequentially storing an information on a printing engine constituted by a plurality of component units when the printing engine performs printing after the initialization operation; and
    a main control unit having a second memory for storing said information on said printing engine, for controlling said engine control unit, wherein
    said main control unit reads said information on said printing engine stored in said second memory and stores said read information in said first memory before initialization operation after power ON, or reads said information on said printing engine stored in said first memory and stores said read information in said second memory before initialization operation after power ON, according to a flag information stored in said first memory.

7. A print control apparatus for a printing apparatus for creating images on a printing medium based on printing data, wherein
    said printing apparatus comprises an engine control unit having a first memory for sequentially storing an information on a printing engine constituted by a plurality of component units when the printing engine performs printing after the initialization operation,
    said print control apparatus comprises a main control unit having a second memory for storing said information on said printing engine, for controlling said engine control unit, and
    said main control unit reads said information on said printing engine stored in said second memory and stores said read information in said first memory before initialization operation after power ON when a flag information stored in said first memory is a first information, and reads information on said printing engine stored in said first memory and stores it in said second memory before the initialization operation after power ON when said flag information is a second information.

8. A print control apparatus for a printing apparatus for creating images on a printing medium based on printing data, wherein
    said printing apparatus comprises an engine control unit having a first memory for sequentially storing an information on a printing engine constituted by a plurality of component units when the printing engine performs printing after the initialization operation,
    said print control apparatus comprises a main control unit having a second memory for storing said information on said printing engine, for controlling said engine control unit, and said main control unit reads said information on said printing engine stored in said first memory and stores said read information in said second memory before initialization operation after power ON, according to a flag information stored in said first memory.

9. A print control apparatus for a printing apparatus for creating images on a printing medium based on printing data, wherein said printing apparatus comprises an engine control unit having a first memory for sequentially storing an information on a printing engine constituted by a plurality of component units when the printing engine performs printing after the initialization operation, said print control apparatus comprises a main control unit having a second memory for storing said information on said printing engine, for controlling said engine control unit, and said main control unit reads said information on said printing engine stored in said second memory and stores said read information in said first memory before initialization operation after power ON, or reads said information on said printing engine stored in said first memory and stores said read information in said second memory before initialization operation after power ON, according to a flag information stored in said first memory.

* * * * *